United States Patent [19]

Foy et al.

[11] 4,331,786
[45] May 25, 1982

[54] MOLDABLE AND/OR EXTRUDABLE POLYETHER-ESTER-AMIDE BLOCK COPOLYMERS

[75] Inventors: Paul R. Foy, Paris; Camille Jungblut; Gérard E. Deleens, both of Orsay, all of France

[73] Assignee: ATO Chimie, Courbevoie, France

[21] Appl. No.: 192,488

[22] Filed: Sep. 30, 1980

Related U.S. Application Data

[63] Continuation-in-part of Ser. No. 150,288, May 16, 1980, which is a continuation of Ser. No. 948,297, Oct. 3, 1978, Pat. No. 4,230,838, which is a continuation of Ser. No. 784,723, Apr. 5, 1977, abandoned, which is a continuation of Ser. No. 582,428, May 10, 1975, abandoned.

[30] Foreign Application Priority Data

Oct. 2, 1980 [FR] France ............................. 79 24486

[51] Int. Cl.³ .......................................... C08L 77/00
[52] U.S. Cl. .................................. 525/408; 525/411; 525/419; 525/430
[58] Field of Search ................. 525/408, 411, 419, 430

[56] References Cited

U.S. PATENT DOCUMENTS

| | | | |
|---|---|---|---|
| 3,265,762 | 8/1966 | Quisenberry | 260/860 |
| 3,549,724 | 12/1970 | Okazaki | 260/857 PG |
| 3,636,135 | 1/1972 | Garforth | 260/857 PG |
| 3,660,356 | 5/1972 | Radlmann | 260/75 N |
| 3,766,146 | 10/1973 | Witsiepe | 260/75 R |
| 3,839,245 | 10/1974 | Schlossman | 260/18 N |
| 3,862,262 | 1/1975 | Hendrick | 260/857 PG |
| 4,105,640 | 8/1978 | Fortuna et al. | 528/292 |
| 4,230,838 | 10/1980 | Foy et al. | 525/408 |

Primary Examiner—Carman J. Seccuro
Attorney, Agent, or Firm—Bacon & Thomas

[57] ABSTRACT

A moldable and/or extrudable polyether-ester-amide block copolymer is disclosed which has the formula

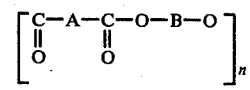

wherein A is a linear saturated aliphatic polyamide sequence formed from a lactam or amino acid having a hydrocarbon chain containing 4 to 14 carbon atoms or from an aliphatic $C_6$–$C_{12}$ dicarboxylic acid and a $C_6$–$C_9$ diamine, in the presence of a chain-limiting aliphatic carboxylic diacid having 4 to 20 carbon atoms; said polyamide having an average molecular weight between 300 and 15,000; and B is a polyoxyalkylene sequence formed from linear or branched aliphatic polyoxyalkylene glycols, mixtures thereof or copolyethers derived therefrom said polyoxyalkylene glycols having a molecular weight of between 200–6,000 and n indicates a sufficient number of repeating units so that said polyether-ester-amide block copolymer has an intrinsic viscosity of from about 0.8 to about 2.05. The polyether-ester-amide block copolymer is prepared by reacting a dicarboxylic polyamide, the COOH groups of which are located at the chain ends, with a pol-oxyalkylene glycol hydroxylated at the chain ends, in the presence of a catalyst constituted by a tetraalkylorthotitanate having the general formula $Ti(OR)_4$, wherein R is a linear branched aliphatic hydrocarbon radical having 1 to 24 carbon atoms.

19 Claims, No Drawings

MOLDABLE AND/OR EXTRUDABLE POLYETHER-ESTER-AMIDE BLOCK COPOLYMERS

This is a continuation-in-part of application Ser. No. 150,288, filed on May 16, 1980, which in turn is a continuation of application Ser. No. 948,297, filed Oct. 3, 1978, now U.S. Pat. No. 4,230,838, which in turn is a continuation of application Ser. No. 784,723, filed Apr. 5, 1977, now abandoned, which is in turn a continuation of application Ser. No. 582,428, filed May 10, 1975, now abandoned.

BACKGROUND OF THE INVENTION

The instant invention relates to a moldable and/or extrudable polyether-ester-amide block copolymers having recurrent units of the formua:

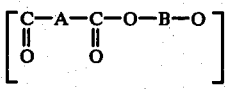

wherein A is a polyamide sequence and B is a polyoxyalkylene sequence and a method for preparing same by condensation of a dicarboxylic polyamide with a polyoxyalkylene glycol.

Polymers of this type have already been prepared by synthesis and used as anti-static additives in the field of spinning and weaving polyamide or polyester fibers with a view to avoid the building-up of electric charges. The French patent specification Nos. 1,444,437 and 2,178,205 disclose methods which comprise reacting a dicarboxylic polyamide with a polyoxyalkylene glycol for obtaining block polycondensates used as anti-static agents. However, the prior art products obtained by these known methods do not exhibit sufficiently satisfactory mechanical properties which permit them to be used as such in molding or extruding operations, and are therefore only used as additives.

SUMMARY OF THE INVENTION

The instant invention is aimed at overcoming these drawbacks, and the object of the invention is to provide polyether-ester-amide block copolymers having mechanical properties which allow these plastic materials to be used in technological transformation operations for the manufacture of molded or extruded articles such as films, sheaths, fibers for textile products, tubes, pipes, etc.

Furthermore, it is an object of the present invention to provide a polycondensation method for preparing polyether-ester-amide copolymers wherein the condensation reaction between the dicarboxylic polyamide and the polyoxyalkylene is substantially complete and block copolymers are obtained which are of sufficient chain length to exhibit a high intrinsic viscosity and to possess excellent mechanical properties.

In particular, it is an object of the present invention to provide such polyether-ester-amide block copolymers which are transformable into anti-static textile fibers consisting essentially only of these copolymers.

It is a further particular object of the present invention to provide such polyether-ester-amide block copolymers which are transformable into form stable shaped articles which are non-elastomeric yet possess a satisfactory degree of softness such as tubes and pipes consisting essentially of these copolymers.

It is a further particular object of the present invention to provide such polyether-ester-amide block copolymers which are elastomers and are transformable into articles consisting essentially of these copolymers, such as impervious or watertight joints, bellows, e.g. automobile hoods, elastomeric fibers and films, elastomeric membranes and balloons.

In order to accomplish the foregoing objects there are provided according to the present invention a moldable and/or extrudable polyether-ester-amide block copolymer of the formula

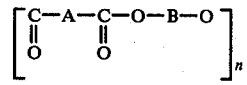

wherein A is a linear saturated aliphatic polyamide sequence formed from a lactam or amino acid having a hydrocarbon chain containing 4 to 14 carbon atoms or from an aliphatic $C_6$–$C_{12}$ dicarboxylic acid and a $C_6$–$C_9$ diamine, in the presence of a chain-limiting aliphatic carboxylic diacid having 4 to 20 carbon atoms; said polyamide having an average molecular weight between 300 and 15,000; and B is a polyoxyalkylene sequence formed from linear or branched aliphatic polyoxyalkylene glycols, mixtures thereof or copolyethers derived therefrom said polyoxyalkylene glycols having a molecular weight of $\leq 6000$ and n indicates a sufficient number of repeating units so that said polyether-ester-amide block copolymer has an intrinsic viscosity of from about 0.8 to about 2.05.

According to the present invention, there is further provided a process for preparing the foregoing polyether-ester-amide block copolymer which comprises the step of reacting a dicarboxylic polyamide, the COOH groups of which are located at the chain ends, with a polyoxyalkylene glycol hydroxylated at the chain ends, in the presence of a catalyst constituted by a tetraalkylorthotinate having the general formula $Ti(OR)_4$, wherein R is a linear branched aliphatic hydrocarbon radical having 1 to 24 carbon atoms.

DETAILED DESCRIPTION OF THE INVENTION

Applicants have found that polycondensation of a dicarboxylic polyamide with a polyoxyalkylene glycol in the presence of the foregoing tetraalkylorthotitanate catalyst leads to novel polyether-ester-amide block copolymers which are distinguished by a high intrinsic viscosity and outstanding mechanical properties.

The method for preparing the polyether-ester-amide block copolymers according to the present invention comprises reacting the dicarboxylic polyamide with the polyoxyalkylene glycol at a sufficiently elevated temperature and under sufficiently high vacuum so that the polymers are in the fused state in the presence of the tetraalkylorthotitanate catalyst. Examples of suitable alkyl groups within the catalyst include methyl, isopropyl, butyl, ethylhexyl, dodecyl, hexadodecyl. Preferably tetrabutyl or tetraisopropylorthotitanate are used.

Carrying out the polycondensation reaction in the presence of the tetraalkylorthotitanate catalyst leads to a great number of advantages regarding the course of the reaction as well as the properties of the resulting products.

At the beginning of the reaction, two non-miscible phases are present, one of which is the polyamide phase which exhibits a comparatively low fluidity. Due to the poor miscibility of the two phases, the reaction mixture is very heterogenous in the beginning. In conventional polycondensation procedures, the polycondensation reactions therefore are not complete, the viscosity values of the block polymer remain small and the product obtained contains a high amount of unreacted polyoxyalkylene glycol. Because of this the resulting product is rendered friable and unable to undergo technological transformation operations such as molding, calendering, extrusion and the like.

However, in the presence of a tetraalkylorthotitanate, the miscibility of the initial two phases of the reaction mixture is much increased leading to a much faster mixing of the phases. This results in an improvement of the reaction rate and a substantially complete reaction and leads to block copolymers of high molecular weight i.e. having an intrinsic viscosity of at least 0.8, and good mechanical properties.

When using the polycondensation method according to the invention, wherein the polycondensation reaction is effected in the fluid state in the presence of a tetraalkylorthotitanate, a product is obtained which has satisfactory mechanical properties and which, consequently, can be submitted to transformation processes such as molding or extrusion.

The catalyst may be used alone or in combination with an alkaline or alkaline-earth alcoholate in an amount of 0.01 to 5% by weight, preferably 0.1 to 5%, most preferably 0.05 to 2% by weight of the total amount of the reaction mixture. For example a mixture of $Ti(OR)_4 + RoNa$ may be used.

The reaction condition for the polycondensation of the dicarboxylic polyamide with the polyoxyalkylene glycol are suitably adjusted such that the reaction components are maintained in the fluid state. Suitably the polycondensation is carried out in the presence of the tetraalkylorthotitanate catalyst under stirring and under a high vacuum, e.g. in the range of 0.05 to 5 mm Hg, preferably 0.5 to 2 mm Hg, at temperatures above the melting points of the constituents used, said temperatures being selected so that the reaction mixture is maintained in the fluid state. Suitably temperatures are between about 100° and about 400° C., and preferably between about 200° and about 300° C.

The reaction period should be sufficient to achieve substantially complete reaction of all of the polyoxyalkylene glycol component in order to obtain a block copolymer having an intrinsic viscosity in the range of from about 0.8 to about 2.05 which is essential for the obtaining of products having satisfactory properties such as required for moldable and/or extrudable plastic materials.

The reaction period may vary depending on the type of polyoxyalkylene glycol and the type and amount of catalyst. In the presence of the tetraalkylorthotitanate catalyst, satisfactory products usually are obtained using a reaction period of from about 10 minutes to about 10 hours, preferably from about 1 to about 7 hours.

Suitably, approximately equimolar amounts of the dicarboxylic polyamide and the polyoxyalkylene glycol are used, since it is preferred that an equimolar ratio should exist between the carboxylic groups and the hydroxyl groups, so that the polycondensation reaction takes place under optimum conditions for achieving a substantially complete reaction and obtaining the desired product.

The polyamides having dicarboxylic chain ends are preferably linear aliphatic polyamides which are obtained by conventional methods currently used for preparing such polyamides, such methods comprising, e.g. the polycondensation of a lactam or the polycondensation of an amino-acid or of a diacid and a diamine, these polycondensation reactions being carried out in the presence of an excess amount of an organic diacid the carboxylic groups of which are preferably located at the ends of the hydrocarbon chain; these carboxylic diacids are fixed during the polycondensation reaction so as to form constituents of the macromolecular polyamide chain, and they are attached more particularly to the ends of this chain, which allows an $\alpha$-$\omega$-dicarboxylic polyamide to be obtained. Furthermore, this diacid acts as a chain limitator. For this reason, an excess amount of $\alpha$-$\omega$-dicarboxylic diacid is used with respect to the amount necessary for obtaining the dicarboxylic polyamide, and by conveniently selecting the magnitude of this excess amount the length of the macromolecular chain and consequently the average molecular weight of the polyamides may be controlled.

The polyamide can be obtained starting from lactams or amino-acids, the hydrocarbon chain of which comprises from 4 to 14 carbon atoms, such as caprolactam, oenantholactam, dodecalactam, undecanolactam, dodecanolactam, 11-amino-undecanoic acid, or 12-aminododecanoic acid.

The polyamide may also be a product of the condensation of a dicarboxylic acid and diamine, the dicarboxylic cid containing 4 to 14 preferably from about 6 to about 12 carbon atoms in its alkylene chain and a diamine containing 4 to 14 preferably from about 6 to about 9 carbon atoms in its alkylene chain. Examples of such polyamides include nylon 6-6, 6-9, 6-10, 6-12 and 9-6, which are products of the condensation of hexamethylene diamine which adipic acid, azelaic acid, sebacic acid, 1,12-dodecanedioic acid, and of nonamethylene diamine with adipic acid.

The diacids which are used as chain limitators of the polyamide synthesis and which provide for the carboxyl chain ends of the resulting dicarboxylic polyamide preferably are aliphatic carboxylic diacids having 4 to 20 carbon atoms, such as succinic acid, adipic acid, suberic acid, azelaic acid, sebacic acid, undecanedioic acid and dodecanedioic acid.

They are used in excess amounts in the proportion required for obtaining a polyamide having the desired average molecular weight within the range of between 300 and 15000 in accordance with conventional calculations such as currently used in the field of polycondensation reactions.

The polyoxyalkylene glycols having hydroxyl chain ends are linear or branched polyoxyalkylene glycols having an average molecular weight of no more than 6000 and containing 2 to about 4 carbon atoms per oxylalkylene unit such as polyoxyethylene glycol, polyoxypropylene glycol, polyoxytetramethylene glycol or mixtures thereof, or a copolyether derived from a mixture of alkylene glycols containing 2 to about 4 carbon atoms or cyclic derivatives thereof, such as ethylene oxide, propylene oxide or tetrahydrofurane.

The polyether-ester-amide block copolymers of the present invention possess excellent antistatic properties and are characterized by a high intrinsic viscosity which is in the range of from about 0.8 to about 2.05 indicating a high degree of polycondensation and a high average molecular weight of the block copolymer. The melting point of the block copolymers is in the range of from about 140° to about 250° C. Furthermore, the block copolymers of the present invention are substantially free from unreacted polyoxyalkylene or polyamide contaminations and the mechanical properties of these block copolymers are such that the copolymers as such can be processed by conventional molding and extruding methods.

The physical properties of the block copolymers will vary depending on the average molecular weights of the polyamide sequences and the polyether sequences in the block copolymer and on the proportion by weight of the polyoxyether-ester sequences relative to the total weight of the block copolymer. Of course, in the preferred case that substantially equimolar amounts of dicarboxylic polyamide and of polyoxyalkylene glycol are used, the by weight proportion of the polyether sequences in the copolymer will depend on the ratio between the average molecular weight of the dicarboxylic polyamide and the average molecular weight of the polyoxyalkylene glycol.

Conventional additives such as anti-oxidants, stabilizing agents against the effects of light and heat, fireproofing agents and pigments may be added to the block copolymer prior to processing it into shaped articles, or when possible, during the polycondensation reaction, in order to improve or modify the properties of the final product depending on the particular use for which the products is intended.

The average molecular weight of the polyamide sequence in the block copolymer may vary from about 300 to about 15,000, preferably from about 300 to about 10,000. In block copolymers suitable for forming form-stable non-elastomeric molded or extruded articles and for forming fibers, the average molecular weight of the polyamide sequences preferably is in the range of from about 800 to about 5000, whereby for fiber forming block copolymers an average molecular weight of the polyamide sequence of about 2000 is most preferred. In block copolymers with elastomeric properties the average molecular weight of the polyamide sequences preferably is in the range of from about 500 to 3,000, most preferably from about 500 to about 2000.

The average molecular weight of the polyoxyalkylene glycols forming the polyoxyalkylene sequence suitably is in the range of from about 200 to about 6,000. In block copolymers which are suitable for formation of form-stable non-elastomeric molded or extruded articles, the molecular weight of the polyoxyalkylene glycol preferably is in the range of from about 400 to about 3,000. In fiber forming block copolymers, the polyoxyalkylene glycol suitably has a low average molecular weight, for example, of less than 400 and comprises dimers, trimers and oligo- and polymers having, e.g. a molecular weight of between about 200 and about 400. In block copolymers with elastomeric properties, the average molecular weight of the polyoxyalkylene glycol may vary from about 400 to about 6000, preferably from about 500 to about 5000, most preferably from about 400 to about 3,000, in particular from about 1,000 to about 3,000.

In fiber forming block copolymers the polyoxyalkylene glycol preferably is a polyethylene glycol. In block copolymers for the production of form-stable non-elastomeric shaped articles or for elastomeric materials the polyoxyalkylene preferably is derived from propylene glycol, tetramethylene glycol or cyclic derivatives or mixtures thereof.

The proportion by weight of the polyoxyalkylene glycol with respect to the total weight of the polyether-ester-amide block copolymer can vary from about 5% to about 90%, suitably from about 5% to about 85%.

If the amount of polyoxyalkylene glycol is in the range of from about 5 to about 50%, the resulting block copolymers are moldable and/or extrudable substantially non-elastomeric products which can be formed into a variety of form-stable shaped articles, fibers and filaments. In block copolymers for the preparation of form-stable shaped articles, the polyoxyalkylene content preferably is in the range of from about 10 to about 50%.

These non-elastomeric block copolymers are characterized by a melting point in the range of from about 98° to about 157° C. and an elongation under tension at yield point in the range of from about 12.5 to about 18%. They exhibit a torsional modulus at 0° C. of from about 147 to about 2400 kg/cm$^2$.

The degree of softness of the non-elastomeric form-stable block copolymers may vary from substantially rigid to super soft depending on the proportion of polyoxyalkylene glycol therein. Block copolymers having a polyoxyalkylene content of between about 15 and about 30% are form-stable and possess a certain softness without containing a plastifying additive. This degree of softness remains substantially constant over a wide temperature range and the shaped articles substantially retain their softness in the cold. Due to these favorable properties, these block copolymers are particularly useful for manufacturing ski boots or parts thereof and for tubes and pipes which have to withstand various temperature changes during use. Block copolymers having a polyoxyalkylene content of above about 30%, that is between about 30 and about 50%, are soft to very soft yet non-elastomeric. These block copolymers are particularly useful for the manufacture of tubes, pipes, balloons, and molded articles.

If the amount of polyoxyalkylene glycol is kept relatively low, e.g. below about 20%, the elastic modulus of the resulting block copolymer is high and the block copolymer is particularly suited for the production of antistatic fibers and filaments. Thus, fiber forming block copolymers suitably contain between about 5 and about 10% of the polyoxyalkylene glycol. The fiber forming block copolymers can be processed into antistatic fibers and filaments by conventional methods, e.g. by spinning in the molten state through the nozzles of a conventional spinning device. Antistatic fibers consisting of the block copolymer according to the present invention present the advantage that the block copolymer in and of itself possesses permanent sufficient antistatic properties to prevent electrostatic charging of the fibers by friction.

If the amount of polyoxyalkylene glycol is between about 45 and about 90%, in particular, between about 50 and about 85%, preferably between about 60 and about 80%, the resulting block copolymers are elastomers having physical and mechanical properties similar to those of natural or synthetic caoutchoucs which are useful for the manufacture of watertight and impervious joints, bellows, diaphragms for hydraulic transmission automobile hoods, elastomeric fibers and films, elastomeric membranes and air balloons and inflatable toys.

As compared with other elastomer substances, the elastomer block copolymers of the present invention present a number of advantages in that no volcanization step is necessary in the course of processing them; they are of substantially colorless sometimes even transparent appearance which facilitates dying; and furthermore waste material can easily be recovered by recycling.

The elastomer block copolymers possess a specific density in the range of about 1. They further possess a flexibility which is retained even in the cold, and a good choc resistancy at low temperatures. The elastomer block copolymers of the present invention are characterized by an intrinsic viscosity in the range of about 0.8 to about 2.05, most often from about 1.2 to about 2.0, a melting pointing point in the range of from about 140° to about 200° C., most often from about 140° to about 180° C., a Vicat point in the range of from about 60° to about 150° C., most often from about 60° to about 100° C., an elongation under tension at yield point of from about 30 to about 200%, preferably from about 80 to about 120%, an elongation at rupture of between about 700 and about 1000%, a Shore A hardness of from about 60 to about 90. They exhibit a torsional modulus in the range of from 400 to 600 at −40° C. and in the range of from about 100 to about 150 at 20° C.

The parameters for identification and quality control of the products are determined as follows:

The Vicat point in °C. is determined in accordance with ASTM standard D 1525 65T.

The intrinsic viscosity is measured in metacresol at 25° C. (initial concentration: 0.8 g per 100 ml).

Elongation under tension is measured in accordance with ASTM standard D 638 67T, and the torsional modulus is measured in accordance with ASTM standard D 1043 61T (according to the CLASH and BERG method).

Hardness is determined as degree Shore A hardness.

Furthermore, fiber forming block copolymers were spun on a machine suitable for processing small quantities of material, the melter temperature being 265° C., the nozzle temperature 255° C., and reeling speed 70 m per minute. The resulting fibers comprise 23 strands, not twisted.

The circular section of each filament is approximately 21 to 24 microns.

The resulting fibers are then cold-stretched at the rate of 4.8, with an unreeling speed of 35.4 m per minute and reeling speed of 170 m per minute. Fibers made from the materials above are spun without oiling treatment, whereas Rilsan (which is 11-polyamide) is given such treatment.

Ohmic resistance measurements were performed on the basis of a 1-meter length of fiber, voltage of 400 V, temperature 20° C., and 65% relative humidity. The ranges of the physical parameters of the block copolymers within the scope of the present invention, in particular the combination of a relatively high intrinsic viscosity with relatively low ranges for melting point and Vicat point, are such that independently of whether the block copolymers are non-elastomeric or elastomeric, they possess satisfactory mechanical strength and are moldable and extrudable. Furthermore, the block copolymers per se exhibit advantageous antistatic properties and a desirable degree of softness without any addition of antistatic or plastifying additives. Accordingly, the block copolymers are resistant against a change of these properties in contact with liquids, since no reduction of these properties due to a washing out or extracting of respective additives in contact with the liquid takes place.

The invention will be further described hereinafter by means of the following examples which are given by way of illustration but not of limitation.

EXAMPLE 1

310 grs. 11-dicarboxylic polyamide having an average molecular weight of 2000, which had previously been prepared by polycondensation of 11-aminoundecanoic acid in the presence of adipic acid was introduced into a reactor having a capacity of 1 liter. 146 grs. polyoxyethylene glycol having an average molecular weight of 1000 and 1.5 grs. tetrabutylorthotitanate was then added. The reactive mixture was placed under an inert atmosphere and heated to a temperature of 260° C.; a vacuum was then produced in the reactor, while the mixture was vigorously stirred from the moment at which the constituents melted. The reaction was carried on during 7 hours at 260° C. under a vacuum of 0.1 mm Hg, and the stirring velocity had to be reduced as the viscosity increased.

The product obtained had an intrinsic viscosity of $\eta=1.2$; differential thermal analysis and thermomechanical analysis showed that the melting point of the product was 173° C.; it presents a first glass transition point at −58° C., and another one at −18° C.

A portion of the product was finely ground to produce a powder having a particle size lower than 0.1 mm; 20 grs. of this powder was extracted with benzene during 24 hours in a Kumagawa extractor. 0.38 grs. polyoxyalkylene glycol which had not reacted was thus recovered, which corresponded to a consumption of at least 95% of the total amount of polyethylene glycol initially used.

The product was then extruded by means of a BRABENDER extruder at 210° C. and at a speed of 30 rpm. At the outlet of the extruder the product was obtained in the form of a string or rod which was cut into small cylinders which were melted by heating so as to allow them to be injection-moulded by means of an ARBURG injection moulding machine.

Test specimens having a thickness of 2 mm and a thinned section of a length of 5 mm were submitted to tension tests at a temperature of 20° C. at a speed of 14 mm per minute. According to ASTM standard D 638 67T tensional elongation was 14% under a stress of 97 kg/sq.cm at the yield point, and 560% under a stress of 280 kg/sq.cm at rupture.

The values of the torsional modulus G (according to the method of CLASH & BERG, ASTM specification No. D 1043 61T) were as follows for the various temperatures indicated:

| T °C.: | −40° C. | −20° C. | 0° C. | 20° C. | 40° C. |
|---|---|---|---|---|---|
| G(kg/sq.cm): | 1040 | 740 | 560 | 510 | 500 |

The Vicat point was 1151° C. under a load of 1 kg with a heating rate of 50° C. per hour.

EXAMPLE 2

For the purpose of comparison the same procedure as the one described in Example 1 was applied, but without using a catalyst, whereas all the other conditions were identical.

The product obtained had an intrinsic viscosity of 0.4 as measured in m-cresol at 25° C. Only 65% of the polyoxyethylene glycol was consumed in the reaction.

No technological quality control test could be carried out on this product, as the latter was too friable.

EXAMPLE 3

Using a mode of operation similar to the one described in Example 1 hereinabove, 88.3 grs. 11-dicarboxylic polyamide (obtained by polycondensation of 11-amino-undecanoic acid in the presence of adipic acid) having an average molecular weight of 3200 was reacted with 11.7 grs. polyoxyethylene glycol having an average molecular weight of 425 in the presence of 0.28 gr. tetrabutylorthotitanate during 5 hours at 280° C. under high vacuum.

A block polycondensate was obtained which contained 11.7% (by weight) recurrent polyoxyethylene glycol units in the combined state in the macromolecule. The entire amount of the polyoxyethylene glycol initially used was consumed during the polycondensation reaction and the product obtained contained no free polyoxyethylene-glycol.

The product obtained had an intrinsic viscosity of 0.80, a Vicat point of 163° C. (at 0° C. under a load of 1 kg) and a melting point of 180° C.

Elongation under tension was 14% under a stress of 183 kg/cm$^2$ at the yield point, and 375% under a stress of 367 kg/cm$^2$ at rupture. The values of the torsional modulus G measured in accordance with the method of CLASH and BERG were as follows for the temperatures indicated:

| T °C.: | −40° C. | −20° C. | 0° C. | 22° C. | 40° C. | 60° C. |
|---|---|---|---|---|---|---|
| G(kg/cm$^2$): | 4127 | 2510 | 1222 | 755 | 614 | 437 |

EXAMPLE 4

Using the mode of operation described in Example 1 hereinabove, 25.1 grs. 11-dicarboxylic polyamide (obtained by polycondensation of 11-aminoundecanoic acid in the presence of adipic acid) having an average molecular weight of 810 was reacted with 74.9 grs. polyoxyethylene glycol having an average molecular weight of 2400 in the presence of 0.46 gr tetrabutylorthotitanate.

The reaction was carried out at 280° C. under high vacuum during 4 hours.

The melting point of the obtained polymer was 140° C.

Its intrinsic viscosity was 1.15 and the block polycondensate contained 75.1% by weight polyethylene glycol in the combined state.

EXAMPLE 5

The catalyst constituted by tetrabutylorthotitanate doped with sodium (catalyst a) was prepared in an anhydrous medium by dissolving 1 gr. sodium in 99 grs. n-butanol and then adding 14.8 grs. tetrabutylorthotitanate. The solution was then diluted with n-butanol to a total volume of 200 ml.

Using the mode of operation described in Example 1, 54 grs. 11-dicarboxylic polyamide having an average molecular weight of 1135 was reacted with 46 grs. polyoxyethylene glycol having an average molecular weight of 970 in the presence of 1.46 grs. tetrabutylorthotitanate doped with sodium (catalyst a) during 4 hours at 280° C. under high vacuum. The product obtained had an intrinsic viscosity of 1.68 and contained 47.9% (by weight) polyoxyethylene glycol in the combined state in the polycondensate, the melting point of which was 150° C. The Vicat point was 125° C. under a load of 1 kg.

Elongation under tension was 15% under a stress of 68 kg/cm$^2$ at the yield point, and 310% under a stress of 165 kg/cm$^2$ at rupture. The values of the torsional modulus G determined according to the method of CLASH & BERG were as follows for the temperatures indicated:

| T °C.: | −40° C. | −20° C. | 0° C. | 22° C. | 60° C. |
|---|---|---|---|---|---|
| G(kg/cm$^2$): | 464 | 314 | 240 | 273 | 160 |

EXAMPLE 6

The catalyst constituted by tetrabutylorthotitanate doped with magnesium (catalyst b) was prepared in an anhydrous medium by dissolving 1.41 grs. magnesium turnings in 300 ml of anhydrous n-butanol. The solution was heated under reflux during 4 hours, and 36 grs. tetrabutylorthotitanate was then added, followed by heating under reflux during 1 hour. The resulting mixture was then cooled and protected against humidity.

In accordance with the mode of operation described in Example 1 hereinabove, 77.4 grs. 11-dicarboxylic polyamide having an average molecular weight of 3420 was reacted with 22.6 grs. of a polyoxypropylene having an average molecular weight of 1000, in the presence of 0.67 gr. tetrabutylorthotitanate doped with magnesium, during 4 hours at 280° C. under high vacuum.

The product obtained had an intrinsic viscosity of 1.5 and contained 25.5% by weight polyoxypropylene glycol in the combined state in the polycondensate the melting point of which was 175° C. The Vicat point was 163° C.

Elongation under tension was 14% under a stress of 162 kg/cm$^2$ at the yield point, and 310% under a stress of 324 kg/cm$^2$ at rupture.

The values of the torsional modulus G measured according to the method of CLASH & BERG were as follows for the temperatures indicated:

| T °C.: | −40° C. | −20° C. | 0° C. | 22° C. | 40° C. | 60° C. |
|---|---|---|---|---|---|---|
| G(kg/cm$^2$): | 2579 | 1547 | 884 | 554 | 408. | 302 |

EXAMPLE 7

Using the same mode of operation as in Example 1 hereinabove, 50.7 grs. 11-dicarboxylic polyamide having an average molecular weight of 1035 was reacted with 49.3 grs. polyoxylene glycol having an average molecular weight of 1000 in the presence of 1.51 grs. catalyst a (tetrabutylorthotitanate doped with sodium) during 6 hours at 280° C. under high vacuum.

The product obtained contained 55.4% by weight polyoxylene glycol at the combined state in the polycondensate and had the following properties:

| melting point: | 157° C. |
|---|---|
| intrinsic viscosity: | 0.90 |
| Vicat point (°C. under a load of 1 kg): | 98 |

Elongation under tension was 18%, under a stress of 54 kg/cm$^2$ at the yield point, and 60% under a stress of 64 kg/cm$^2$ at rupture.

The values of the torsional modulus G measured according to the method of CLASH & BERG were as follows for the temperatures indicated:

| T °C.: | −40° C. | −20° C. | 0° C. | 22° C. | 60° C. |
|---|---|---|---|---|---|
| G(kg/cm$^2$): | 295 | 151 | 147 | 180 | 120 |

EXAMPLE 8

In accordance with the mode of operation described in Example 1 hereinabove, 75.6 grs. 11-dicarboxylic polyamide having an average molecular weight of 3100 was reacted with 24.4 grs. polyoxytetramethylene glycol having an average molecular weight of 1000, in the presence of 0.73 gr. catalyst a (tetrabutylorthotitanate doped with sodium) during 4 hours at 280° C.

The polycondensate obtained contained 25.2% (by weight) polyoxytetramethylene glycol in the combined state.

The properties were as follows:

| | |
|---|---|
| melting point: | 180° C. |
| intrinsic viscosity: | 1.10 |
| Vicat point (°C. under a load of 1 kg): | 163° C. |
| Elongation under tension was 18% under a stress of 137 kg/cm$^2$ at the yield point, and 327% under a stress of 227 kg/cm$^2$ at rupture. | |

The values of the torsional modulus G (CLASH & BERG) were as follows for the temperatures indicated:

| T °C.: | −40° C. | −20° C. | 0° C. | 22° C. | 60° C. |
|---|---|---|---|---|---|
| G(kg/cm$^2$): | 2650 | 1600 | 1000 | 825 | 400 |

EXAMPLE 9

In accordance with the mode of operation described in Example 1 hereinabove, 51.7 grs. 11-dicarboxylic polyamide having an average molecular weight of 1000 was reacted with 48.3 grs. polyoxytetramethylene glycol having an average molecular weight of 1000 in the presence of 1.45 gr. catalyst a (tetrabutylorthotitanate doped with sodium) during 6 hours at 280° C. under high vacuum. The block copolymer obtained contained 52.9% by weight polyoxytetramethylene glycol in the combined state.

The properties were as follows:

| | |
|---|---|
| melting point: | 165° C. |
| intrinsic viscosity: | 1.44 |
| Vicat point (°C. under a load of 1 kg): | 115° C. |
| elongation under tension was 18% under a stress of 54 kg/cm$^2$ at the yield point, and 647% under a stress of 118 kg/cm$^2$ at rupture. | |

The values of the torsional modulus G (CLASH & BERG) were as follows for the temperatures indicated:

| T °C.: | −40° C. | −20° C. | 0° C. | 22° C. | 40° C. | 60° C. |
|---|---|---|---|---|---|---|
| G(kg/cm$^2$): | 773 | 364 | 299 | 238 | 182 | 131 |

EXAMPLE 10

25 grs. 12-aminododecanoic acid were introduced into a reactor comprising an agitator and means for connecting the reactor to a vacuum source. The acid was heated during 3 hours at a temperature comprised between 220° and 240° C. under reduced pressure, and the polycondensation was limited by adding 4 grs. adipic acid. A dicarboxylic polyamide having an average molecular weight of 1084 was thus obtained; the same carboxylic dipolyamide may also be obtained by hydrolytic polymerization of lactam 12 under pressure at a temperature of 300° C. in the presence of adipic acid.

27.9 grs. polytetramethylene glycol having an average molecular weight of 1000 was added to 24.7 grs. of the above-mentioned dicarboxylic dipolyamide in the presence of 0.68 gr. tetrabutylorthotitanate.

The reactive mixture was heated in an inert atmosphere until a temperature of 280° C. was reached.

The mixture was then placed under high vacuum (0.1 mm Hg) and the reaction was continued during 3 hours under stirring.

The obtained product had an intrinsic viscosity of 1.3 and contained 48.16% (by weight) polyoxytetramethylene glycol in the combined state in the polycondensate.

EXAMPLE 11

Using the mode of operation similar to the one described in Example 1 hereinabove, 68 grs. 11-dicarboxylic polyamide (obtained by polycondensation of 11-aminoundecanoic acid in the presence of adipic acid) having an average molecular weight of 2000 was reacted with 32 grs. polyoxyethylene glycol having an average molecular weight of 1000 in the presence of 0.33 gr. tetraisopropylorthotitanate during 7 hours at 260° C. under high vacuum.

A block polycondensate was obtained which has an intrinsic viscosity of 1.2 and contained 33% (by weight) recurrent polyethylene glycol units in the combined state in the molecule, while the melting point of the product obtained was 173° C.

EXAMPLE 12

310 grs. of the dicarboxylic polyamide used in Example 11 and 152 grs. copolyethylene glycolpolypropylene glycol (50/50) having an average molecular weight of 1000 were introduced together with 1.3 gr. tetraisopropylorthotitanate into a reactor having a capacity of 1 l.

The reaction was carried out under the same conditions as those described in Example 1. The obtained product has an intrinsic viscosity of 1.4, and the yield was 96% with respect to the consumption of copolyoxyalkylene glycol.

EXAMPLE 13

48.3 grs. dihexylammonium azelaate salt (F=151°–152° C.) and 3.35 grs. adipic acid were introduced into a reactor comprising an agitator and means for connection with a vacuum source. The reactive mixture was heated to a temperature of 180° C. during 3 hours and to a temperature comprised between 180° C. and 250° C. during 2 hours. A 6.9 dicarboxylic polyamide having an average molecular weight of 1886 was obtained.

17.6 grs. polyoxytetramethylene glycol having an average molecular weight of 1000 was added to 32 grs.

of this dicarboxylic polyamide in the presence of 0.51 gr. tetrabutylorthotitanate. The reactive mixture was placed in an inert atmosphere and heated until a temperature of 280° C. was reached; the mixture was then placed under high vacuum (0.1 mm Hg), and the reaction was continued during 2 hours under stirring.

The product obtained had an intrinsic viscosity of 2.05 and contained 36.5% by weight polyoxytetramethylene glycol in the combined state in the polycondensate. Its melting point was 148° C.

EXAMPLE 14

273 grs. dihexylammonium sebacate salt (F=172°-173° C.) and 19.06 grs. adipic acid was introduced into a reactor comprising an agitator and means for connection to a vacuum source; the mixture was heated to a temperature comprised between 200° and 220° C. during 4 hours. A 6.10-dicarboxylic polyamide having an average molecular weight of 1332 was thus obtained. 230 grs. polyoxytetramethylene glycol having an average molecular weight of 1000 was added to 306 grs. of this dicarboxylic polyamide in the presence of 1.5 gr. tetrabutylorthotitanate.

The reactive mixture was placed under an inert atmosphere and heated until a temperature of 280° C. was reached; the mixture was then placed under high vacuum (0.1 mm Hg) and the reaction was continued under stirring during 3 hours.

The product obtained had an intrinsic viscosity of 1.40 and contained 46.93% by weight tetraoxymethylene glycol in the combined state in the polycondensate.

Its melting point was 170° C.

EXAMPLE 15

100 grs. hexyldiammonium dodecanoic salt (F=160° C.) and 7.1 grs. adipic acid were introduced into a reactor provided with an agitator and with means for connection to a vacuum source, and the mixture was heated during 3 hours to 170° C., and then heated during 2 hours to a temperature comprised between 180° C. and 250° C.

A 6.12-dicarboxylic polyamide having an average molecular weight of 1998 was thus obtained. 15.5 grs. polytetramethylene glycol having an average molecular weight of 1000 was added to 131 grs. of this dicarboxylic polyamide in the presence of 0.52 gr. tetrabutylorthotitanate. The reactive mixture was placed in an inert atmosphere and heated until a temperature of 280° C. was reached; the mixture was then placed under high vacuum (0.1 mm Hg) and the reaction was continued during 3 hours under stirring.

The product thus obtained had an intrinsic viscosity of 1.56 and contained 32.2% (by weight) polyoxytetramethylene glycol in the combined state in the polycondensate.

Its melting point was 159° C.

EXAMPLE 16

865 grs. of 6-dicarboxylic polyamide having an average molecular weight of 1400 and still containing 3.6% (by weight) caprolactam, and 400 grs. polytetramethylene glycol having an average molecular weight of 650 were introduced together with 6.4 grs. tetrabutylorthotitanate into a reactor provided with agitating means and with means for connection with a vacuum source. A partial vacuum was established with a view to eliminating the gases from the reactive medium. The reactive mixture was heated to 240° C. during one hour. When this temperature was reached, a vacuum of 1 mm Hg was established and the polycondensation reaction was continued for 2 hours, during which period of time the temperature increased so as to reach 255° C. The reaction was then discontinued. The weight of the lactam recovered under vacuum during the reaction was 29 grs. The product obtained contained 5.3% substances having a low molecular weight which were extracted with benzene, and it had the following properties:

| intrinsic viscosity: | 1.45 |
|---|---|
| Vicat point: | 162° C. under a load of 1 kg |
| elongation under tension was 12.5% under a stress of 103 kg/sq.cm at the yield point, and 490% under a stress of 425 kg/sq.cm at rupture. | |

The values of the torsional modulus G were as follows for the temperatures indicated (as determined according to the method of CLASH & BERG):

| T °C.: | −40 | −20 | 0 | 20 | 60 |
|---|---|---|---|---|---|
| G(kg/sq.cm). | 3400 | 1900 | 1200 | 860 | 530 |

EXAMPLE 17

Using an operating mode similar to that described in Example 1 hereinabove, 560 grs. 12-dicarboxylic polyamide (obtained by the polycondensation of lactam 12 in the presence of adipic acid) having an average molecular weight of 5600 was reacted with 102 grs. polyoxypropylene glycol having an average molecular weight of 1020 in the presence of 4 grs. tetraorthobutyltitanate during 6 hours at 250° C. under a vacuum of 0.3 mm Hg in a reactor. A block polycondensate was obtained which contained 15.4% (by weight) recurrent polyoxypropylene glycol units in the combined state in the macromolecule. The entire amount of the polyoxypropylene glycol initially used had been consumed during the polycondensation reaction. The product obtained had the following properties:

| intrinsic viscosity: | 1.4 |
|---|---|
| Vicat point: | 157° C. (under a load of 1 kg) |
| Softening point: | 175° C. |
| Elongation under tension was 365% under a stress of 375 kg/sq.cm at rupture | |

The values of the torsional modulus G according to the method of CLASH & BERG were as follows, for the temperatures indicated:

| T °C.: | −40 | −20 | 0 | 22 | 40 | 60 |
|---|---|---|---|---|---|---|
| G(kg/sq.cm): | 4600 | 3300 | 2400 | 1700 | 860 | 620 |

EXAMPLE 18

Into a 90 liter reactor equipped with an agitation means there are introduced 8.5 kg of an 11-dicarboxylic polyamide having an average molecular weight of 850 which has previously been prepared by polycondensation of 11-amino undecanoic acid in the presence of adipic acid.

Subsequently, 20 kg of a polytetramethylene glycol having an average molecular weight of 2000 and 90 grs. of tetrabutylorthotitanate catalyst were added. Air was removed from the reactor by means of a stream of nitrogen and the reactor was partially evacuated to a pressure of 1 torr. Under agitation, the temperature is raised to 260° C. and the reaction is carried out at this temperature for a period of 3 hours.

After cooling, the resulting product is extruded, granulated and dried. The product is elastic.

The intrinsic viscosity is 1.85.
The vicat point is 70° C.
The melting point is 168° C.
The Shore A hardness is 80.

The tensional elongation is 90% under a stress of 30 kg/cm$^2$ at the yield point and 900% under a stress of 240 kg/cm$^2$ at rupture.

The torsional modulus of rigidity determined according to the method of CLASH & BERG is 225 kg/cm$^2$ at −40° C. and is less than 150 kg/cm$^2$ at 20° C.

EXAMPLE 19

Analogously to the method described in Example 18, 7.5 kg of a polyamide-12 having adipic acid end chains which has been obtained by polymerization of 12-aminolauric acid lactam in the presence of adipic acid and has an average molecular weight of 750 are reacted with 20 kg of a polytetramethylene glycol having an average molecular weight of 2000 in the presence of 90 grs. of tetrabutylorthotitanate for a period of 3 hours. After the reaction is terminated, an elastomer block copolymer is obtained which has an intrinsic viscosity of 2.0, a Vicat point of 62° C. under a load of 1 kg and a melting point of 158° C.

The Shore A hardness is 70.

The tensional elongation is 110% under a stress of 25 kg/cm$^2$ at yield point and 950% under a stress of 280 kg/cm$^2$ at rupture.

The torsional modulus of rigidity determined by the method of CLASH & BERG is 450 kg/cm$^2$ at −40° C. and 150 kg/cm$^2$ at 20° C.

EXAMPLE 20

209 grs. dicarboxylic 11-polyamide with an average molecular weight of 2090, obtained by polycondensation of 11-aminoundecanoic acid in the presence of adipic acid, was placed in a 1-liter reactor. 42.5 grs. of polyoxyethylene glycol having an average molecular weight of 425 and 1 g tetrabutylorthotitanate were then added. The reaction mixture was heated in an inert atmosphere (e.g. under nitrogen) to a temperature of 260° C. A vacuum was then created inside the reactor and the reaction continued, while the mixture was stirred vigorously, at 260° C. for 4 hours in an 0.1 mm Hg vacuum.

The resulting product had the following properties:

| intrinsic viscosity | 1.4 |
|---|---|
| melting point | 173° C. |
| Vitreous transition point | −60° C. |

This product contained 17% weight of polyoxyalkylene glycol sequence in relation to the total mass. The product was spun in two batches. Table 1 shows the properties of the fibers in these two batches, containing 23 strands, not twisted.

| BATCH | 1 | 2 |
|---|---|---|
| Grist in deniers | 3.75 | 3.12 |

-continued

| BATCH | 1 | 2 |
|---|---|---|
| Rupture strength in g | 310 | 308 |
| % elongation at rupture point | 29.3 | 18.0 |
| Elastic modulus in g/denier | 13.5 | 15.1 |
| Resistance in ohms/m fiber | 4.89 10$^{15}$ | 5.82 10$^{15}$ |

EXAMPLE 21

1 kg 6-dicarboxylic polyamide, with a molar mass of 2,000, was made to react in a 6-liter stainless reactor with 212 g polyoxyethylene glycol, with a molar mass of 425, and 3.5 g Ti (OBu)$_4$.

The reaction mixture was placed in an inert atmosphere and heated to a temperature of 260° C. A vacuum was then created inside the reactor and the reaction continued, while the mixture was well-stirred at a temperature of 260° C. for four hours in an 0.1 mm Hg vacuum.

The resulting product had the following properties:

| intrinsic viscosity | 1.45 |
|---|---|
| melting point | 192° C. |

The product contained 17% weight of polyoxyethylene glycol sequence in relation to the total mass.

The resistivity in ohms per meter was $7.5 \times 10^8$.

EXAMPLE 22

1 kg 6-6-dicarboxylic polyamide, with a molar mass of 2,000, was made to react in a 6-liter stainless steel reactor with 212 g polyoxyethylene glycol, with a molar mass of 425, and 3.5 g Ti (OBu)$_4$.

The reaction mixture was placed in a nitrogen atmosphere and heated to a temperature of 270° C. The reaction continued in an 0.5 mm Hg vacuum, while the mixture was well agitated, for one hour at 265° C. and for one hour at 285° C.

The resulting product had the following properties:

| intrinsic viscosity | 1.4 |
|---|---|
| melting point | 145° C. |

The product contained 15% weight of polyoxyethylene glycol sequence in relation to the total mass.

The resistivity in ohms per meter was $1.2 \times 10^9$.

It is to be understood that the invention is not limited to the specific examples described hereinabove which are given only by way of illustration, and that modifications may be made within the scope of the appended claims without departing from the spirit of the invention.

What is claimed is:

1. A moldable and extrudable polyether-esteramide block copolymer of the formula

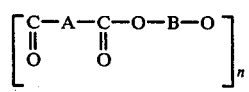

wherein A is a linear saturated aliphatic polyamide sequence formed from a lactam or amino acid having a hydrocarbon chain containing 4 to 14 carbon atoms or from an aliphatic C$_6$–C$_{12}$ dicarboxylic acid and a C$_6$–C$_9$ diamine, in the presence of a chain-limiting aliphatic carboxylic diacid having 4 to 20 carbon atoms; said polyamide having an average molecular weight between 300 and 15000; and B is a polyoxyalkylene sequence formed from linear or branched aliphatic polyoxyalkylene glycols, said polyoxyalkylene glycols having a molecular weight of from about 200 to about 6000 and n indicates a sufficient number of repeating units so that said polyether-ester-amide block copolymer has an intrinsic viscosity of from about 0.8 to about 2.05.

2. The moldable and extrudable polyether-ester-amide block copolymer as defined in claim 1 wherein the polyoxyalkylene glycol is a polymer of an alkylene glycol containing 2 to 4 carbon atoms or of a cyclic derivative thereof or a copolymer of a mixture of said alkylene glycols or cyclic derivatives thereof.

3. The moldable and extrudable polyether-ester-amide block copolymer as defined in claim 2 wherein the polyoxyalkylene glycol has an average molecular weight of from about 200 to about 3000.

4. The moldable and extrudable polyether-ester-amide block copolymer as defined in claim 3 wherein the polyoxyalkylene glycol has an average molecular weight of from about 200 to about 400.

5. The moldable and extrudable polyether-ester-amide block copolymer as defined in claim 3 wherein the polyoxyalkylene glycol has an average molecular weight of from about 400 to about 3000.

6. The moldable and extrudable polyether-ester-amide block copolymer as defined in claim 2 wherein the polyoxyalkylene glycol has an average molecular weight of from about 500 to about 5000.

7. The moldable and extrudable polyether-ester-amide block copolymer as defined in claim 1 wherein the polyamide has a molecular weight of from about 800 and about 5000.

8. The moldable and extrudable polyether-ester-amide block copolymer as defined in claim 1 wherein the proportion by weight of the polyoxyalkylene glycol is from about 5 to about 85%.

9. The moldable and extrudable polyether-ester amide block copolymer as defined in claim 8 wherein the proportion by weight of the polyoxyalkylene glycol is from about 5 to about 50%.

10. The moldable and extrudable polyether-ester-amide block copolymer as defined in claim 9 wherein the proportion by weight of the polyoxyalkylene glycol is from about 5 to about 10%.

11. The moldable and extrudable polyether-ester-amide block copolymer as defined in claim 9 wherein the proportion by weight of the polyalkylene glycol is from about 10 to about 50%.

12. The moldable and extrudable polyether-ester-amide block copolymer as defined in claim 8 wherein the proportion by weight is from about 45 to about 85%.

13. The moldable and extrudable polyether-ester-amide block copolymer as defined in claim 12 wherein the proportion by weight of the polyoxyalkylene glycol is from about 50 to about 85%.

14. The moldable and extrudable polyether-ester-amide block copolymer as defined in claim 13 wherein the proportion by weight of the polyoxyalkylene glycol is from about 60 to about 80%.

15. The polyether-ester-amide block copolymer of claim 1 wherein the lactam or amino acid having a hydrocarbon chain of 4 to 14 carbon atoms is selected from the group consisting of caprolactam, oenantholactam, dodecalactam, undecanolcatam, dodecanolactam, 11-aminoundecanoic acid, and 12-aminododecanoic acid.

16. The polyether-ester-amide block copolymer of claim 1 wherein the polyamide is formed from a dicarboxylic acid and a diamine wherein the diamine is hexamethylene diamine or nonamethylene diamine and the acid is adipic acid, azelaic acid, sebacic acid, or 1,12-dodecanedioic acid.

17. The polyether-ester-amide block copolymer of claim 1 wherein the chain-limiting carboxylic aliphatic diacid is acid selected from the group consisting of succinic acid, adipic acid, suberic acid, azelaic acid, sebacic acid, undecanedioic acid and dodecanedioic acid.

18. The polyether-ester-amide block copolymer of claim 2 wherein the polyoxyalkylene glycol is selected from the group consisting of polyoxyethylene glycol, polyoxypropylene glycol, polyoxytetramethylene glycol, mixtures thereof and a copolyether derived therefrom.

19. A process for preparing the polyether-ester-amide block copolymer as defined in claim 1 which comprises the step of reacting a dicarboxylic polyamide as defined in claim 1, the COOH groups of which are located at the chain ends, with a polyoxyalkylene glycol as defined in claim 1 hydroxylated at the chain ends, in the presence of a catalyst constituted by a tetraalkylorthotitanate having the formula $Ti(OR)_4$, wherein R is a linear branched aliphatic hydrocarbon radical having 1 to 24 carbon atoms at a sufficiently high temperature and under sufficiently high vacuum so that the reactants are in the fused state.

* * * * *

UNITED STATES PATENT AND TRADEMARK OFFICE
CERTIFICATE OF CORRECTION

PATENT NO. : 4,331,786

DATED : May 25, 1982

INVENTOR(S) : Paul R. Foy, et al.

It is certified that error appears in the above—identified patent and that said Letters Patent is hereby corrected as shown below:

Column 1, line 18, "formua" should read -- formula --.

Column 4, line 59, "oxylalkylene" should read -- oxyalkylene --.

Signed and Sealed this

Twelfth Day of October 1982

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,331,786
DATED : May 25, 1982
INVENTOR(S) : Paul R. Foy et al

It is certified that error appears in the above-identified patent and that said Letters Patent is hereby corrected as shown below:

Column 7, line 1, "volcanization" should read -- vulcanization --.

Column 8, line 58, "1151°C" should read -- 151°C --.

Column 10, line 58, "at" should read -- in --.

Column 18, line 48, insert -- or -- between "linear" and "branched"

On the title page, in the abstract, 6th line from the bottom, "pol-oxyalkylene" should read -- polyoxyalkylene --.

Column 2, line 43, insert -- or -- between "linear" and "branched".

Column 3, line 34, "RoNa" should read -- RONa --.

Signed and Sealed this

Tenth Day of May 1983

[SEAL]

Attest:

GERALD J. MOSSINGHOFF

Attesting Officer   Commissioner of Patents and Trademarks